Dec. 24, 1957     T. KOOTZ ET AL     2,817,584
METHOD FOR REFINING PIG IRON
Filed May 23, 1955     3 Sheets-Sheet 1

Inventors:
Theodor Kootz and
Heinrich Rellermayer
By: Michael S. Striker
  agt.

Dec. 24, 1957   T. KOOTZ ET AL   2,817,584
METHOD FOR REFINING PIG IRON
Filed May 23, 1955   3 Sheets-Sheet 2

INVENTORS:
Theodor Kootz and
Heinrich Rellermayer
BY: Michael S. Struker
agt.

Dec. 24, 1957  T. KOOTZ ET AL  2,817,584
METHOD FOR REFINING PIG IRON
Filed May 23, 1955  3 Sheets-Sheet 3

Inventors:
Theodor Kootz and
Heinrich Rellermayer
By: Michael S. Striker
agt.

United States Patent Office 2,817,584
Patented Dec. 24, 1957

2,817,584
METHOD FOR REFINING PIG IRON

Theodor Kootz, Dinslaken, Niederrhein, and Heinrich Rellermeyer, Duisburg-Hamborn, Germany, assignors to August Thyssen-Hütte Aktiengesellschaft and Dortmund-Hörder Hüttenunion Aktiengesellschaft, Duisburg-Hamborn and Dortmund, Germany, respectively Application May 23, 1955, Serial No. 510,275

Claims priority, application Germany May 25, 1954

20 Claims. (Cl. 75—60)

The present invention relates to new and improved methods and apparatus for the refining of pig iron and more particularly to the dephosphorization and decarbonization of pig iron to produce steel.

The refining of molten iron has as a primary objective thereof the removal in the form of gases or slag-forming compounds of such impurities as carbon and phosphorous from the molten iron. This is primarily accomplished by oxidation whereby the carbon combines with oxygen to form a carbon oxide which is removed in the form of a gas whereby the phosphorous goes into the slag. The oxidation of these and other constituents of the molten pig iron generally produces sufficient heat to supply the heat requirements of the refining process.

In contrast to the conventional conversion processes; e. g., the Bessemer process in which the air or other oxygen-containing gas is blown through the molten iron, the refining methods wherein the air or other oxygen-containing gas is injected directly at the molten metal surface can achieve an adequate dephosphorization only if the dephosphorization is completed prior to the completion of the decarbonization of the pig iron.

However, it is very difficult to control the refining process so that the dephosphorization is completed before the end of the decarbonization, and methods in which this is accomplished by first dephosphorizing without substantially decarbonizing and subsequently decarbonizing are time-consuming and consequently expensive.

It is therefore an object of the present invention to provide a method of refining pig iron whereby the dephosphorization and decarbonization can proceed substantially simultaneously while still achieving adequate, and in fact, excellent dephosphorization.

It is another object of the present invention to provide a method of refining pig iron whereby the decarbonization may be completed before the dephosphorization is completed, or, vice versa, wherein the dephosphorization may be completed before the completion of the decarbonization.

It is still another object of the present invention to provide a method of dephosphorizing and decarbonizing pig iron by the injecting of air or the like at the molten metal surface, rather than by blowing the air through the molten metal, in a rapid and highly effective manner.

It is a further object of the present invention to provide a method of producing a low phosphorous steel from high or low phosphorous-containing pig iron while obtaining substantially any desired carbon content in the final steel.

It is still a further object of the present invention to provide an apparatus for carrying out the method of the present invention.

Another object of the present invention contemplates the provision of an apparatus for the refining of phosphorous-containing pig iron in which dephosphorization and decarbonization of the pig iron can proceed substantially simultaneously.

Other objects and advantages of the present invention will be apparent from a further reading of the specification and of the appended claims.

In order to fully understand our invention it is first necessary to describe our hitherto unpublished method of dephosphorizing pig iron by the injection of air onto the molten metal surface according to which method the dephosphorization was completed before the decarbonization, the present invention being an improvement in and invention over this unpublished method.

According to this unpublished method the decarbonization of the molten pig iron is at first retarded by maintaining a relatively large distance between the nozzle opening of the tuyeres or lance and the upper surface of the molten metal bath, or by utilizing a relatively low oxygen pressure. This is continued until after the formation of an iron oxide-rich lime slag which can slagify most of the phosphorous. Then the decarbonization is started by reversing the up to now process conditions, for instance in such a way that a smaller distance between the nozzle opening and the surface of the bath is maintained or the oxygen pressure is increased. In this way it may be that the carbon reduces the surplus iron oxide in the slag so that at the end of the refining an iron-poor phosphate slag similar to the one obtained in the usual refining method is also hereby obtained.

However, disadvantages and difficulties of this method exist in that the two steps of this method have to be carried out under utmost precision with respect to timing and that the smallest deviations in time intervals lead either to excessive phosphorous content in the metal or to excessive iron content in the slag; and also in that starting the decarbonization after the preliminary retardation of the decarbonization reaction may result in the occurrence of strong discharge phenomena.

We have carried out the above method not only with a single lance but also with a plurality of lances. However, when using a plurality of lances the method was always as above described, namely all of the lances being adjusted with respect to distance from the surface of the metal bath and oxygen pressure first for dephosphorization and subsequently for decarbonization. The same disadvantages as above described were obtained when using the plurality of lances as when using a single lance.

It is thus still another object of the present invention to provide a method of dephosphorizing and decarbonising pig iron whereby it is unnecessary to proceed to first dephosphorize the pig iron before decarbonizing the same.

With all of the above and still other objects in view the present invention mainly consists in a method of refining a molten bath of phosphorous-containing pig iron also containing carbon and being covered by a slag layer, comprising the steps of blowing at least one first stream of gas containing free oxygen through the slag layer onto the molten bath of pig iron so as to decarbonize the molten pig iron, and blowing at least one second stream of gas containing free oxygen onto the slag layer without contacting the molten bath of pig iron so as to oxidize the slag layer, whereby the molten pig iron below the slag layer is dephosphorized, thus decarbonizing the dephosphorizing the pig iron.

In accordance with the present invention, both streams of gas containing free oxygen, which may be air, air enriched with oxygen, pure commercial oxygen, or any suitable mixture of oxygen with other gases, e. g., the first stream of gas which achieves decarbonization and the second stream of gas which achieves dephosphorization, are blown simultaneously in the converter.

The different effects from each air stream, e. g., decarbonization from one and dephosphorization from the other may be achieved in different ways. For example, the air may be emitted from two different nozzle openings both at substantially the same height above the level of the molten bath, with the air in one nozzle being at a higher pressure than the air in the other nozzle, the pressure and speed of the air from the first nozzle being sufficient to pass through the slag layer and onto the molten metal bath, while the pressure and speed of the air from the second nozzle not being sufficient to pass completely through the slag layer atop the molten metal bath.

On the other hand, the air or other oxygen-containing gas can come from two different nozzles at the same pressure and speed, with one nozzle opening being at a greater distance above the molten metal bath than the other, the distances being adjusted so that from the first nozzle opening the air passes through the slag layer and onto the molten metal bath for decarbonization, while from the other nozzle opening the air only reaches the slag layer without passing completely through the same so that from this nozzle opening the air does not contact the molten metal bath directly and thereby results in dephosphorization.

It is apparent that from the above given principle of the present invention it is possible for someone skilled in the art to adjust the distance from each nozzle opening to the upper surface of the molten metal bath, the pressure of the air or other oxygen-containing gas in the blowing means and the speed of the air emitted from the nozzle openings so as to achieve decarbonization from one air stream and dephosphorization from the other air stream; and it is also apparent that exact values suitable for all converter operations cannot be given since the values vary depending upon many variables, such as slag consistency, amount of slag, etc.

However, the following numerical values for a particular operation in which decarbonization is achieved from one stream of air and dephosphorization from another stream of air will serve to illustrate the type of adjustments necessary to achieve decarbonization from one stream of air and dephosphorization from the other. It is to be understood that these values are given for illustrative purposes only and the scope of the invention is no ways meant to be limited to specific values.

Assuming that the pressure in each of two lances is the same, e. g., 6–8 atmospheres, and that the speed of the air emitted from each lance is the same, e. g., 1000 m./sec., the distance of the first lance from the surface of the molten metal bath in order to achieve decarbonization would be 300–500 mm., while the distance of the second lance from the surface of the molten metal bath in order to achieve dephosphorization would be 800–1200 mm.

On the other hand, assuming the same distance of both nozzles from the top of the molten metal bath, e. g., a distance of 400 mm., the pressure of the air should be at 7 atmospheres and the speed of emission of the air should be 1000 m./sec. from the first nozzle to achieve decarbonization, and the pressure of the air should be 3 atmospheres and the speed of the air 450 m./sec. from the second nozzle to achieve dephosphorization.

It is apparent also that a plurality of air streams for decarbonization and a plurality of air streams for dephosphorization may be utilized instead of a single air stream for each. The use of such plurality of streams is advantageous from the point of view of speed, whereas the use of single streams is advantageous from the point of view of simpler apparatus requirements.

In accordance with the present invention, after substantially complete or desired predetermined dephosphorization is attained, the air stream which has been utilized for dephosphorization is adjusted by either increasing the speed thereof or moving the lance closer to the surface of the molten metal bath so that this air stream is now utilized for decarbonization until substantially complete decarbonization or until a predetermined degree of decarbonization has been reached.

Likewise in accordance with the present invention, in the event that decarbonization to a predetermined degree is first attained, the air stream which has been utilized for decarbonization is adjusted by either decreasing the speed thereof or moving the lance further from the surface of the molten metal bath so that this air stream is now utilized for dephosphorization until substantially complete dephosphorization or until a predetermined degree of dephosphorization has been reached. In either case, the remaining lance or lances may be utilized for the same purpose, e. g., decarbonization or dephosphorization.

It is preferred that the various lances, e. g., those for decarbonization and those for dephosphorization, be spaced sufficiently from each other so that they do not interfere with each other in their functions thereof.

Since the decarbonization under the first stream of air and dephosphorization under the second stream of air is relatively limited to the region of the particular air stream, it is preferred to move the streams of air and the molten bath of pig iron covered by the slag layer relative to each other in a direction transverse to the direction of the air streams.

In addition to the above-described method of the present invention and other embodiments of the present invention which will become apparent from the further description herein, the invention also contemplates an apparatus for carrying out the method of the present invention and mainly consisting, in a converter for the conversion of pig iron to steel, in combination, first blowing means for introducing a first stream of gas containing free oxygen through a layer of slag covering a molten bath of pig iron onto the molten bath of pig iron so as to decarbonize the molten pig iron, and second blowing means for introducing a second stream of gas containing free oxygen onto the layer of slag covering the molten bath of pig iron without contacting the molten bath of pig iron so as to oxidize the slag layer and consequently dephosphorize the pig iron below the same.

The blowing means may each be, independently of the other, movable towards and away from the molten metal bath. Also, each blowing means may be provided with a means for adjusting the pressure of the air in the blowing means and thereby also the speed of the air emitted from each blowing means so that the air from the first blowing means can pass through the slag layer and onto the molten metal bath while the air from the other blowing means only contacts the slag layer without passing completely through the same.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
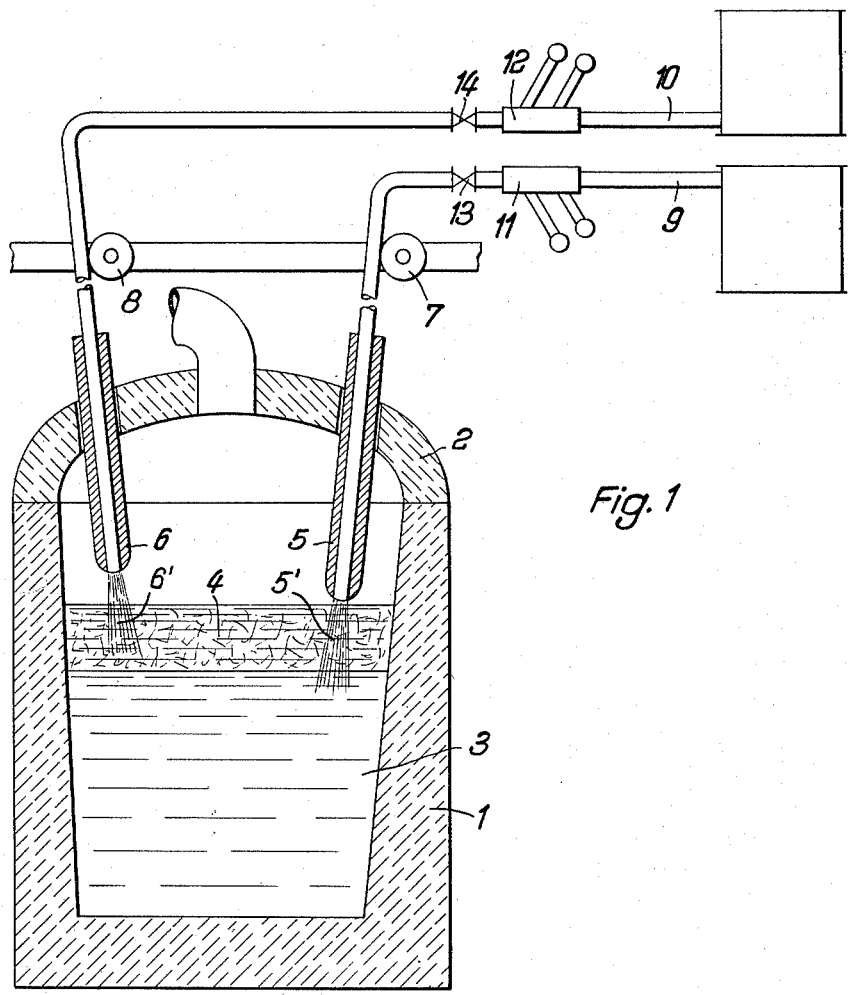
Fig. 1 is a diagrammatic cross-sectional view of an apparatus in accordance with the present invention and in which the method of the present invention can be carried out.

Referring now to the drawings and more particularly to Fig. 1, a converter container 1 is provided with a cover member 2. In the converter 1 there is contained a molten bath of pig iron 3 and a layer of slag 4 covering the molten pig iron bath. A lance 5 from which is emitted an air stream 5' which goes through the slag layer 4 and contacts or penetrates into the molten pig iron 3 in the position shown serves for decarbonization. The lance 5 is provided with a raising and lowering device 7 for moving the lance towards and away from the molten metal bath. Similarly, the lance 6 is provided with a raising and lowering device 8 for moving the lance towards and away from the molten metal bath. In the position shown, the air stream 6' emitted from the lance 6 only reaches the slag layer 4 and does not reach the molten metal bath 3 so that the air stream 6' from the lance 6 serves for dephosphorization.

The conduit 9 conducts the gas containing free oxygen through the mixing device 11 which adjusts the composition of the gas to the lance 5. Conduit 9 is provided with a valve 13. Similarly conduit 10 conducts a gas containing free oxygen through the gas mixing device 12 to the lance 6, conduit 10 being provided with a valve 14.

Figure 2:
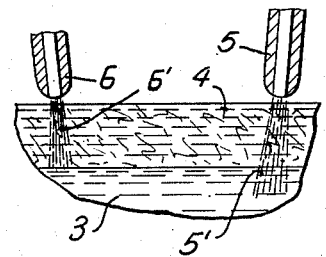
Fig. 2 is a fragmentary cross-sectional view indicating the operation of the device of Fig. 1 when the two lances are at the same level.

In Fig. 2 the lances 5 and 6 are shown adjusted at the same distance from the molten metal bath, the air stream 5' from the lance 5 contacting the molten metal bath 3 while the air stream 6' from the lance 6 only contacts the slag layer 4, the difference being due to differences in pressure and speed of the air streams coming from the respective lances.

Figure 3:
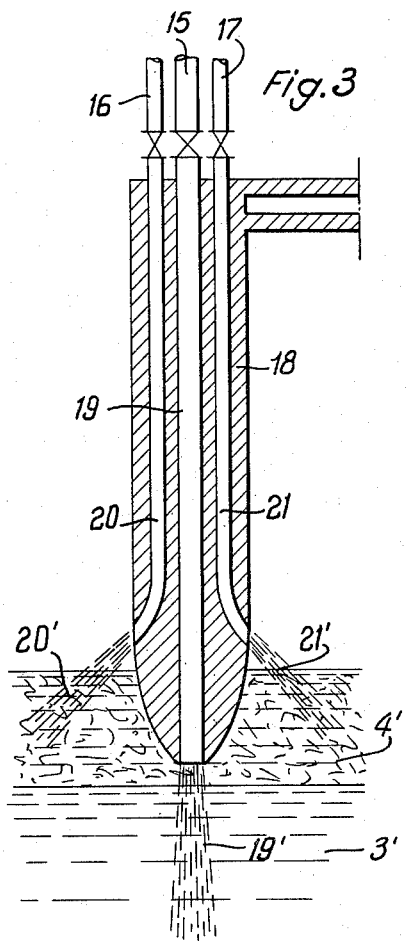
Fig. 3 is a fragmentary cross-sectional view of another embodiment of the present invention.

In Fig. 3 a lance 18 is shown provided with three separate conduits 19, 20 and 21, conduit 19 having its outlet end at the tip of the lance 18 and conduits 20 and 21 having outlet ends located higher up on the lance 18. Each conduit in the lance 18 is provided with a separate inlet conduit, conduit 19 being provided with inlet conduit 15, and conduits 20 and 21 being provided with inlet conduits 16 and 17 respectively. The air or other gas containing free oxygen emitted from the conduit 19 in the form of gas stream 19' contacts the molten metal bath 3' while the air emitted from the conduits 20 and 21 in the form of air streams 20' and 21' respectively only contacts the slag layer 4' and does not contact the molten pig iron layer 3'.

Figure 5:
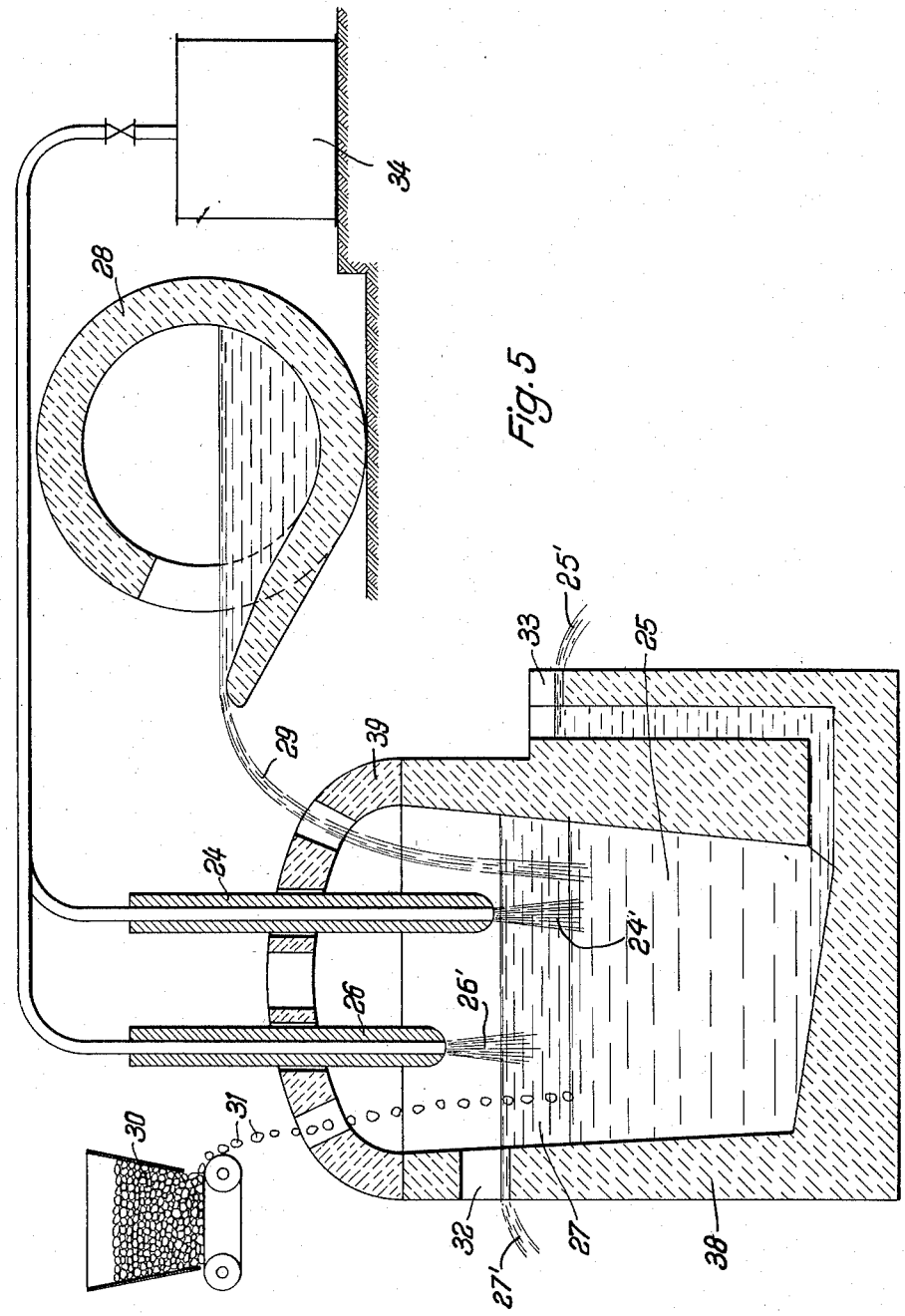
Fig. 5 is a diagrammatic cross-sectional view of a complete apparatus for continuously carrying out the method of the present invention.

In Fig. 5 a lance 35 supplied by a single conduit 36 is shown, the lance 35 having a main outlet conduit 37 and two auxiliary outlet conduits 22 and 23, the outlet ends of the main conduit 37 being at the tip of the lance 35 and the outlet ends of the auxiliary conduits 22 and 23 being higher on the lance 35. The air emitted from all of the conduits in the lance 35 is at the same pressure and at the same speed, however, due to the difference in level of the outlet ends, the air stream 37' from the conduit 37 contacts the molten pig iron bath 3'' while the air streams 22' and 23' coming from outlet conduits 22 and 23 respectively only contact the covering slag layer 4''.

Figure 4:
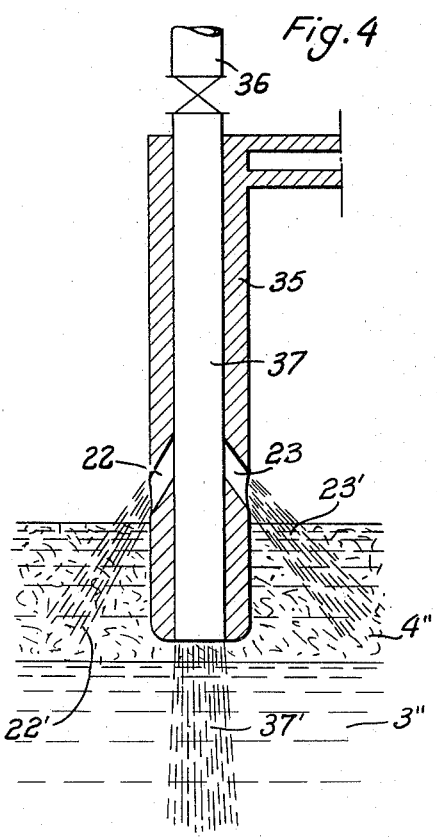
Fig. 4 is a fragmentary cross-sectional view of still another embodiment of the present invention.

In the embodiments of Figs. 3 and 4 the lance should preferably be substantially perpendicular to the surface of the molten metal bath so that the air stream from the middle conduit which provides decarbonization is substantially perpendicular to the surface of the bath while the air streams from the outer conduits which provide for dephosphorization are at an angle to the surface of the slag layer. This results in there being some distance between the tip of the lance and the air streams from the outer conduits for dephosphorization. The distance from the openings of the outer conduits of dephosphorization from the opening of the inner conduit at the tip of the lance for decarbonization should be at least 10 cm. The distance can, depending upon the thickness of the slag layer, be as high as 60 cm. The angular air streams for the dephosphorization should go onto or into the slag and it is preferred that these air streams penetrate the waste gas from the decarbonization without being burned.

Fig. 5 illustrates an apparatus for continuous conversion of pig iron to steel with simultaneous dephosphorization and decarbonization. A molten pig iron bath 25 covered by a slag layer 27 is contained in the converter container 38 provided with a cover member 39. The apparatus is provided with two lances 24 and 26. As shown, the outlet opening of the lance 24 is below the outlet opening of the lance 26 i. e. the outlet opening of the lance 24 is closer to the molten pig iron bath than the outlet opening of the lance 26. The air stream 24' emitted from the lance 24 passes through the slag layer 27 and contacts the molten pig iron bath 25, while the air stream 26' emitted from the lance 26 only contacts the slag layer 27.

The storage container 28 continuously supplies molten pig iron 29 to the converter while the additive supply apparatus 30 continues to supply the necessary additives such as lime and the like 31 to the converter. The steel 25' and the slag 27' are discharged through discharges 33 and 32 respectively in an amount depending upon the speed of introduction of the reactants and the speed of the refining. The location of the discharges 33 and 32 and the speed of introduction of the pig iron 29 and additives 31 control the heights of the molten pig iron and the slag layer respectively and maintain the same constant. 34 indicates the gas blowing and storage device.

As indicated above the particular distance of each lance opening from the molten metal bath and the speed of air emitted from each lance opening in order to achieve dephosphorization or decarbonization is dependent upon the particular consistency of the slag, the height of the slag and various other factors. The height of the slag in relationship to the depth of the molten pig iron bath will vary depending upon the type of pig iron utilized. Thus, in the case of Thomas pig iron the volume ratio of slag to iron is about 0.7:1, in the case of steel pig iron the volume ratio is generally about 0.4:1, and in the case of pig iron types which are poor in additives such as cupola pig iron, the ratio of slag to molten metal is about 0.2:1. Of course the thickness of the slag layer for any given ratio depends upon the capacity of the vessel.

In accordance with the present invention it is not only possible to regulate the depth of penetration of the gas containing free oxygen emitted from the lances by regulation of the pressure of the gas, the speed of emission of the same and the distance of the outlet end of the lance from the surface of the metal bath, but each gas stream can be independently regulated as desired with respect to composition, e. g., oxygen content, carbon dioxide content, water vapor content, etc.

If various gas mixtures are blown through each lance, the lance under which decarbonization should take place is preferably more oxygen-rich, e. g., a more strongly refining gas, and most preferably pure oxygen, than the other lance under which dephosphorization is to take place, the other lance being a relatively oxygen-poor refining gas, e. g., air or mixtures of $O_2$ and air or mixtures of $O_2$ and $H_2O$ and/or $CO_2$.

The oxygen supplied through the individual lances may be so regulated that the dephosphorization may with complete certainty be completed during the course of the decarbonization and with holding of the iron content of the slag to a truly low level (of about 7–12%), so that the refining process may be completed with almost any carbon content, either high or low, e. g., in the range of about 0.05–1.0% C by weight. This is due to the fact that each of the two reactions, decarbonization and dephosphorization, has, corresponding to the concentration of the elements in the iron, a specific oxygen requirement. The higher the carbon content is to be at the completion of the dephosphorization, the faster the necessary amount of oxygen for the dephosphorization should be in order to achieve the dephosphorization sufficiently before the decarbonization. As indicated above, after completion of the decarbonization, all of the lances may be utilized for decarbonization and it is thereby possible to obtain any final carbon content in the steel with a very iron-poor slag.

It is also possible, after the main dephosphorization which is completed with a relatively high carbon content in the metal of about 0.5–2.0%, to draw-off the first slag, and after renewed basic additive addition, e. g., the addition of lime, to further blow in the same manner as before the removal of the first slag so that decarbonization takes place under one lance and dephosphorization under the other lance. In this manner a steel having a particularly low phosphorous content, e. g., lower than 0.03% P and preferably lower than 0.02% P is obtained while the carbon content is still maintained in the range of about 0.05–0.50%.

The method of the present invention has also been found applicable to the refining of steel pig iron types having only a rather low phosphorus content of for example less than 0.5% P as well as to phosphorus-containing Bessemer pig iron and the present invention provides important advantages in either case.

If it is desired to operate with only a single lance and if it is not necessary to refine to a very great extent, that is until a low carbon content in the iron below 0.1%, preferably below 0.05% C and to an iron content in the slag of above 15%, it is necessary that the phosphorous content in the original pig iron be maintained lower than 0.2% and preferably below 0.15%. According to the present invention it is possible without difficulties to refine pig iron types with less than 0.5% P under a single slag, that is without removal and substitution of a fresh slag, to a phosphorous content of less than 0.02% P and with a carbon content of more than 0.1% in the iron, without re-refining. However, also with such phosphorous-poor types of pig iron, slag exchange can still be recommended in order to arrive at especially low phosphorous and sulfur contents in the steel, preferably of less than 0.015% P and of less than 0.015% S.

The present invention has many advantages, among which are that due to the separate dephosphorization and decarbonization reactions which are carried out substantially simultaneously according to the method of the present invention both reactions can be very accurately determined and the entire course of the refining can be carried out with great accuracy. It might be thought that the decarbonization under one lance would interfere with the dephosphorization under the other lance, but this is not the case. On the contrary, the decarbonization results in such lively and good bath movement that the dephosphorization is actually only improved and promoted. It is thereby possible to carry out the reaction at very high speeds of air blowing so as to have a very short blowing time, which is not higher than in the known conversion processes such as the Bessemer process wherein the air is blown through the metal bath.

In addition, the refining process according to the present invention proceeds without the slightest discharge phenomena. Finally the conversion in accordance with the method of the present invention ends with a slag which has a very low iron content and the steel likewise has a very low oxygen content and is very pure.

In accordance with further tests carried out utilizing the principles of the present invention, namely of blowing at least one stream of gas containing free oxygen through a slag layer and onto a molten pig iron bath for decarbonization purposes and blowing at least another stream of gas containing free oxygen onto the slag layer without contacting the molten pig iron bath for dephosphorization purposes, it has been found possible to retain controllable higher carbon contents in the bath while still obtaining low phosphorous contents, and thereby to obtain with greater certainty homogeneous steel. This may be achieved in the following manner:

Only a portion of the pig iron to be treated is introduced into the converter and this is refined in accordance with the present invention as described above. The smaller the fraction of the total gaseous oxygen offered to the bath which is directly blown on the top of or into the molten metal surface as compared to the fraction which only comes in contact with the slag and is absorbed by the slag, the higher is it possible to maintain the carbon contents while substantially complete dephosphorization is achieved. Thereafter, the refining is continued under simultaneous addition of pig iron and under further continuous or periodic addition of additives such as lime and the like, with proper proportioning of the amounts of each, whereby the continuously added pig iron is nearly immediately adjusted to the desired low phosphorous content and the desired low carbon content.

The action of the air or other gas containing oxygen blown onto or into the slag layer without passing completely through the same to the molten metal bath, or dephosphorization, can be increased by the addition of solid oxygen-containing carriers such as ores or spars. As much as 10% of ores (relative to the amount of pig iron) having an oxygen content of up to 2.5% by weight may be utilized for this purpose.

The present invention has particular applications to the continuous production and withdrawal of the produced steel. This is most simply accomplished by continuously introducing proper proportions of pig iron, additives, and oxygen in the form of at least one stream for decarbonization and at least one stream for dephosphorization, and continuous withdrawal of the produced steel and slag by means of taps located at proper levels.

According to another embodiment of the present invention the converter vessel at the beginning of the process is empty or practically empty and the pig iron is continuously introduced therein and as it is introduced it is continuously converted in accordance with the method of the present invention utilizing at least one stream of air for decarbonization and at least one stream of air for dephosphorization. Thereby, when the converter vessel is filled, it contains practically only steel and slag, the steel and slag then being drawn off and the process started again. In accordance with this embodiment, since the level of the molten metal is continuously being raised, the blowing lances must also be continuously raised whereby the distance of each lance from the upper surface of the metal bath remains unchanged as the converter vessel is being filled.

In accordance with the present invention it is possible to obtain steel with extremely low phosphorous content of for example 0.050% P while being able to vary the carbon content within rather wide limits, e. g., between 0.02% to 0.90%.

The following examples are given to further illustrate the present invention, the scope of the invention not however being limited to the specific details of the examples.

Example 1

30 tons of Thomas pig iron containing 2% phosphorous, 1.0% manganese, 0.3% silicon and about 3.7% carbon are introduced at a temperature of 1200 to 1250° C. into a converter vessel provided with three lances. At the beginning all three lances are arranged at a distance of 300 mm. from the upper surface of the bath and technically pure oxygen consisting of 98% oxygen at a pressure of 4.5–6 atmospheres is blown through the openings in the lances, each of which has a diameter of 30 mm. at an exit speed of 750 m./sec., this preliminary blowing continuing for 6 minutes during which the lime, which is burned lime consisting of 80–90% pure CaO and the usual impurities, such as $SiO_2$, MgO, FeO and small amounts of $CO_2$ and $H_2O$, is added and liquified. The amount of burned lime added is 12%.

Thereupon, two of the lances are moved a distance of 600 mm. from the upper surface of the molten bath and the blowing is continued for an additional 8 minutes until the carbon flame disappears. The temperature of the steel is between 1600–1670° C. and the thus obtained steel contains 0.08% carbon, 0.04% phosphorous and 0.18% manganese. The slag contains about 10.5% of iron and about 18% phosphoric acid. The steel has extremely low contents of nitrogen and oxygen.

*Example 2*

30 tons of Thomas pig iron of the same composition as in Example 1 is introduced at the same temperature and into the same apparatus as in Example 1.

At the beginning while 10% of the same lime as in Example 1 is added all three lances are arranged 300 mm. from the upper surface of the molten metal bath and blown for 5 minutes at the same pressure and speed and with the same technically pure oxygen as in Example 1. Thereupon two of the lances are moved further away from the surface of the bath so that the same are 600 mm. from the upper surface, and the other lance is moved still closer to the upper surface of the bath so that this lance is about 200 mm. from the upper surface of the bath. At the same time the oxygen content of the latter lance is reduced to two-thirds of the original oxygen content. The blowing is then continued for an additional 7 minutes at which time it is completed.

The molten metal still contains 1.2% carbon, 0.15% phosphorous and about 0.30% manganese. The slag only contains 8.5% iron with a phosphoric acid content of about 20%. The slag is then removed and 4% of lime is again added to the molten metal. The lances are then adjusted so that one lance is only 300 mm. from the upper surface of the bath while the other two lances are about 600 mm. from the upper surface of the bath so that the oxygen of the latter two lances does not pass through the slag. The blowing is then continued for 4 minutes with 98% pure oxygen at a pressure of 4.5–6 atmospheres and at a speed of 750 m./sec., until the carbon flame is extinguished whereupon the conversion is completed. The molten steel is at a temperature of 1600° C. to 1670° C. The steel contains 0.07% carbon and only about 0.016% phosphorous. The slag contains 15% iron and only 2.5% phosphoric acid.

*Example 3*

30 tons of pig iron containing 0.35% phosphorous about 3.2% manganese and about 0.5% silicon is introduced at a temperature of 1200–1250° C. in the same apparatus as in the previous examples. All three lances are arranged about 300 mm. from the upper surface of the bath and are blown with the same oxygen composition and at the same pressure and speed as in Example 1 for 4 minutes while 8% of the same burned lime as in Example 1 is being added. Thereupon only one of the lances is moved away from the surface of the bath so that the distance of this lance from the distance of the bath is about 600 mm. whereby the oxygen blown through this lance no longer passes through the surface of the slag and does not reach the metal bath. The other two lances remain in their original position. The blowing is then continued for another 9 minutes until the end of the decarbonization. The molten steel thus obtained is at a temperature of 1600–1670° C. The steel contains 0.11% carbon, 0.35% manganese and 0.030% phosphorous. The iron content of the slag is about 11.5%.

*Example 4*

30 tons of the same pig iron as in Example 3 is introduced at the same temperature and into the same apparatus as in Example 3. All three lances are originally arranged 300 mm. from the surface of the bath and are blown for 3 minutes with the same gas composition as in Example 3 while 6% of lime is being added. One of the lances is then moved 600 mm. from the surface of the bath and the blowing is continued for an additional 7 minutes. The blowing is then stopped.

The metal bath contains about 0.9% carbon, 0.050% phosphorous and 0.7% manganese. The slag has only a low iron content, containing less than 10% of iron.

The slag is then removed and 3% of additional iron is added to the molten metal. The blowing with oxygen is then continued with two of the lances arranged 300 mm. from the surface of the bath and the third lance arranged 600 mm. from the surface of the bath. After about 3 minutes of blowing the melt is practically completely decarbonized. The steel obtained contains 0.08% carbon, only 0.013% phosphorous and about 0.16% manganese. The slag contains about 12.5% iron and only about 1.5% phosphoric acid. In all cases, the steel is very poor in nitrogen and contains only a very low amount of oxygen, which before the de-oxidation has a value of not more than 0.050%.

*Example 5*

This example illustrates a continuous method of operation.

A steel pig iron containing 2.3% manganese, 0.8% silicon, 4.2% carbon and 0.4% phosphorous is introduced into a converter vessel supplied with 4 blowing lances at a rate of 100 tons per hour which is equal to 1.67 tons per minute. 12% of shot is added, which is equal to 200 kg. of shot per minute. 4.5% burned lime, containing 85% CaO, 3% $SiO_2$, 1.5% $Al_2O_3$ and the rest glowing losses, is added, which is at a rate of 75 kg. per minute.

Technically pure oxygen consisting of 98% oxygen is blown through 4 lances in an amount of 95 normal cubic meters per ton of pig iron which is equal to 158 normal cubic meters per minute which is approximately equivalent to 40 normal cubic meters of oxygen per lance per minute. At 6 to 8 atmospheres of pressure in the conduits to the lances and with a lance opening of each lance of about 29 mm. diameter, the speed of the gas from each lance is 1000 m./sec. (calculated). Three of the lances are arranged at a distance of 400 mm. from the surface of the molten metal bath so that the oxygen from these lances penetrates the slag layer and reaches the molten metal bath to effect decarbonization, while the other lance is arranged 1000 mm. from the surface of the molten metal bath so that the oxygen from this lance does not pass completely through the slag bath and therefore effects only dephosphorization.

The yield by this process is 1.65 tons of steel per minute at a temperature of about 1600–1670° C., the steel containing 0.18% manganese, 0.03% carbon, 0.017% phosphorous and 0.004% nitrogen. 242 kg. of slag per minute is obtained, the slag containing 31% CaO, 18.5% MnO, 17.8% FeO, 12% $SiO_2$, 6.2% $P_2O_5$ and the remainder MgO and $Al_2O_3$. The steel is finished in the ladle.

*Example 6*

This is an example of discontinuous operation with continuous introduction.

The capacity of the converter vessel is 50 tons and the total refining time is 20 minutes. 45 tons of pig iron containing 3.8% C, 1.2% Mn, 1.0% P, and 0.5% Si is introduced at a rate of 2.25 tons per minute. An addition of 5.0% burned lime having the composition of the burned lime in Example 5 is introduced at a rate of 113 kg. per minute and 5% of shot is also introduced at a rate of 113 kg. per minute.

The blowing is carried out with technically pure oxygen containing 98% oxygen in an amount of 90 normal cubic meters of oxygen per ton of pig iron through 3 blowing lances. Two of the blowing lances are arranged 400 mm. from the surface of the molten metal bath from which two lances is delivered the oxygen in an amount of 60 normal cubic meters per ton of pig iron. The oxygen streams from these two lances pass through the slag layer and into the molten metal and thereby effect decarbonization. The third lance is arranged 1000 mm. from the surface of the molten metal bath and delivers 30 normal cubic meters per ton of pig iron. The oxygen stream from the third lance only contacts the slag layer and thereby effects dephosphorization and slagification of the Si, Mn and Fe. Each lance delivers 67.5 normal cubic meters per minute. The calculated speed of the oxygen emitted from each lance, each lance having an opening of 38 mm. diameter, is 1000 m./sec.

The yield is 43 tons of steel after 20 minutes. The steel contains 0.05% C, 0.09% Mn and 0.04% P. 5.7 tons of slag (equal to 13% slag) is obtained containing 39.5% CaO, 12% MnO, 15% FeO, 8.5% $SiO_2$, 18% $P_2O_5$, and the remainder MgO and $Al_2O_3$.

Upon filling of the vessel the smelting is completed, the slag is removed and after the usual finishing operation the molten metal is poured off.

*Example 7*

This example illustrates the continuous refining of Thomas pig iron.

Thomas pig iron containing 3.7% C, 2.1% P, 0.3% Si and 1.2% Mn is introduced into a converter at a rate of 60 tons per hour which is equal to 1 ton per minute.

10% of burned lime having the same composition as in Example 5 is introduced at a rate of 100 kg. per minute, and 8% of shot is introduced at a rate of 80 kg. per minute. The oxygen required for the decarbonization which is 55% of the total requirement is introduced, in the form of technically pure oxygen containing 98% oxygen, through one nozzle arranged at a distance of 400 mm. from the surface of the metal bath. The oxygen is introduced through this nozzle in an amount of 47 normal cubic meters of oxygen per ton of pig iron and per minute under a pressure of 6 to 8 atmospheres and at a speed of 1000 m./sec., the nozzle opening being 29 mm. in diameter.

Through each of the other two nozzles which are arranged 600 mm. from the surface of the molten metal bath is introduced 19 normal cubic meters of oxygen per ton of pig iron and per minute in the form of air containing 30% oxygen, which is equal to 63 normal cubic meters of oxygen-enriched air per ton of pig iron and per minute. The pressure of the air in each of these two lances is 4 to 6 atmospheres and each nozzle opening is 60 mm. so that the calculated speed of the air leaving the nozzle is 700 m./sec. The air from these nozzles does not reach the molten metal bath and is blown only on the slag to effect dephosphorization.

Each minute 980 kg. of steel is run off containing 0.04% C, 0.12% Mn, 0.035% P and 0.006% N. At the same time 214 kg. of slag is withdrawn per minute, the slag containing 47% CaO, 22.5% $P_2O_5$, 3.5% $SiO_2$, 12.0% FeO, 6.0% MnO and the rest MgO and $Al_2O_3$.

The steel is continuously run off into pouring ladles and is finished in the usual manner in the ladle.

It will be understood that each of the elements described above, or two or more together, may also find a useful application in other types of pig iron refining methods and apparatus therefor differing from the types described above.

While the invention has been illustrated and described as embodied in methods and apparatus for refining pig iron with substantially simultaneous decarbonization and dephosphorization, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of refining a molten bath of phosphorous-containing pig iron also containing carbon and being covered by a slag layer, the steps of blowing at least one first stream of gas containing free oxygen through said slag layer onto said molten bath of pig iron so as to decarbonize said molten pig iron; and blowing at least one second stream of gas containing free oxygen onto said slag layer without contacting said molten bath of pig iron so as to oxidize said slag layer, whereby the molten pig iron below said slag layer is dephosphorized, thus decarbonizing and dephosphorizing said pig iron.

2. A method according to claim 1 in which the original molten bath of phosphorous-containing pig iron also containing carbon contains more than 1.0% by weight of carbon, and in which the blowing of said second stream of gas containing free oxygen onto said slag layer for the dephosphorization of said molten pig iron is adjusted to substantially complete dephosphorization when the carbon content of said pig iron is between 0.05–1.0% by weight.

3. A method according to claim 1 in which the original molten bath of phosphorous-containing pig iron also containing carbon contains at least 0.5% by weight of carbon and more than 0.05% by weight of phosphorous, said dephosphorization by blowing of said second stream of gas containing free oxygen is continued to a phosphorous content of between 0.05–0.15% by weight while the carbon content is between 0.5–2% by weight, whereupon said slag layer is removed, basic additives are added to the remaining molten bath of pig iron so as to form a new slag layer, and decarbonization by blowing of said first stream of gas containing free oxygen through said slag layer and onto said molten bath of pig iron and dephosphorization by blowing of said second stream of gas containing free oxygen onto said slag layer without contacting said molten bath of pig iron is continued until substantially complete dephosphorization of said pig iron and until the carbon content of said pig iron is between 0.05 and 0.50% by weight.

4. In a method of refining a molten bath of phosphorous-containing pig iron also containing carbon and being covered by a slag layer, the steps of blowing at least one first stream of gas containing free oxygen through said slag layer onto said molten bath of pig iron so as to decarbonize said molten pig iron; and simultaneously blowing at least one second stream of gas containing free oxygen onto said slag layer without contacting said molten bath of pig iron so as to oxidize said slag layer, whereby the molten pig iron below said slag layer is dephosphorized, thus decarbonizing and dephosphorizing said pig iron.

5. In a method of refining a molten bath of phosphorous-containing pig iron also containing carbon and being covered by a slag layer, the steps of blowing at least one first stream of gas containing free oxygen from a nozzle at a predetermined distance above said slag layer at a speed sufficient to pass through said slag layer and at least onto said molten pig iron; and blowing at least one second stream of gas containing free oxygen from a nozzle at said predetermined distance above said slag layer at a speed sufficient to reach said slag layer but not sufficient to pass completely through the same so as to oxidize said slag layer, whereby the molten pig iron below said slag layer is dephosphorized, thus decarbonizing and dephosphorizing said pig iron.

6. In a method of refining a molten bath of phosphorous-containing pig iron also containing carbon and being covered by a slag layer, the steps of blowing at least one first stream of gas containing free oxygen from a nozzle at a first predetermined distance above said molten bath of pig iron at a predetermined speed sufficient to pass through said slag layer and at least onto said molten pig iron; and blowing at least one second stream of gas containing free oxygen from a nozzle at a second predetermined distance above said molten bath of pig iron and also above said slag layer, said second predetermined distance above said molten bath of pig iron being greater than said first predetermined distance, at approximately said same predetermined speed as said first stream of gas which from said second predetermined distance is sufficient to reach said slag layer but not sufficient to pass completely through the same so as to oxidize said slag layer, whereby the molten pig iron below said slag layer is dephosphorized, thus decarbonizing and dephosphorizing said pig iron.

7. In a method of refining a molten bath of phosphorous-containing pig iron also containing carbon and being covered by a slag layer, the steps of blowing a plurality of first streams of gas containing free oxygen through said slag layer onto said molten bath of pig iron so as to decarbonize said molten pig iron; and blowing a plurality of second streams of gas containing free oxygen onto said slag layer without contacting said molten bath of pig iron so as to oxidize said slag layer, whereby the molten pig iron below said slag layer is dephosphorized, thus decarbonizing and dephosphorizing said pig iron.

8. In a method of refining a molten bath of phosphorous-containing pig iron also containing carbon and being covered by a slag layer, the steps of blowing at least one first stream of gas containing free oxygen through said slag layer onto said molten bath of pig iron so as to decarbonize said molten pig iron; blowing at least one second stream of gas containing free oxygen onto said slag layer without contacting said molten bath of pig iron so as to oxidize said slag layer, whereby the molten pig iron below said slag layer is dephosphorized, thus decarbonizing and dephosphorizing said pig iron, said blowing of said second stream of gas continuing until predetermined dephosphorization of said pig iron is attained; and subsequently continuing to blow said second stream of gas containing free oxygen however through said slag layer onto said molten bath of pig iron until predetermined decarbonization of said pig iron.

9. In a method of refining a molten bath of phosphorous-containing pig iron also containing carbon and being covered by a slag layer, the steps of blowing at least one first stream of gas containing free oxygen through said slag layer onto said molten bath of pig iron so as to decarbonize said molten pig iron; blowing at least one second stream of gas containing free oxygen onto said slag layer without contacting said molten bath of pig iron so as to oxidize said slag layer, whereby the molten pig iron below said slag layer is dephosphorized, thus decarbonizing and dephosphorizing said pig iron; and moving said first and second streams of gas and said molten bath of pig iron covered by said slag layer relative to each other in a direction transverse to the direction of said streams of gas.

10. In a method of refining a molten bath of phosphorous-containing pig iron also containing carbon and being covered by a slag layer, the steps of blowing at least one first stream of gas containing free oxygen through said slag layer onto said molten bath of pig iron so as to decarbonize said molten pig iron; blowing at least one second stream of gas containing free oxygen onto said slag layer without contacting said molten bath of pig iron so as to oxidize said slag layer, whereby the molten pig iron below said slag layer is dephosphorized, thus decarbonizing and dephosphorizing said pig iron, said blowing of said first stream of gas continuing until predetermined decarbonization of said pig iron; and subsequently continuing to blow said first stream of gas containing free oxygen however only onto said slag layer without contacting said molten bath of pig iron until substantially complete dephosphorization of said pig iron.

11. In a method of refining a molten bath of phosphorous-containing pig iron containing less than 0.5% by weight of phosphorous also containing carbon and being covered by a slag layer, the steps of blowing at least one first stream of gas containing free oxygen through said slag layer onto said molten bath of pig iron so as to decarbonize said molten pig iron; and blowing at least one second stream of gas containing free oxygen onto said slag layer without contacting said molten bath of pig iron so as to oxidize said slag layer, whereby the molten pig iron below said slag layer is dephosphorized, thus decarbonizing and dephosphorizing said pig iron.

12. In a method of refining a molten bath of phosphorous-containing pig iron also containing carbon and being covered by a slag layer, the steps of blowing at least one first stream of gas containing free oxygen through said slag layer onto said molten bath of pig iron so as to decarbonize said molten pig iron; blowing at least one second stream of gas containing free oxygen onto said slag layer without contacting said molten bath of pig iron so as to oxidize said slag layer, whereby the molten pig iron below said slag layer is dephosphorized, thus decarbonizing and dephosphorizing said pig iron; and simultaneously during said blowing of said first and said second streams of gas adding basic additives to said molten bath.

13. A method according to claim 12 in which said molten pig iron and said additives are introduced into a substantially empty converter vessel and said first and second streams of gas containing free oxygen blowing respectively onto said molten pig iron and onto said slag layer are blown onto the same as said converter vessel is being filled, whereby the refining is substantially completed at the time that said converter vessel is substantially filled.

14. A method according to claim 13 in which said first and second streams of gas containing free oxygen are blown from nozzles each at a predetermined distance above said slag layer, and wherein each of said predetermined distances above said slag layer is maintained constant during filling of said converter vessel.

15. In a method of refining a molten bath of phosphorous-containing pig iron also containing carbon and being covered by a slag layer, the steps of blowing at least one first stream of gas containing free oxygen through said slag layer onto said molten bath of pig iron so as to decarbonize said molten pig iron; blowing at least one second stream of gas containing free oxygen onto said slag layer without contacting said molten bath of pig iron so as to oxidize said slag layer, whereby the molten pig iron below said slag layer is dephosphorized, thus decarbonizing and dephosphorizing said pig iron; and simultaneously during said blowing of said first and said second streams of gas adding a continuous stream of basic additives to said molten bath.

16. In a method of refining a molten bath of phosphorous-containing pig iron also containing carbon and being covered by a slag layer, the steps of blowing at least one first stream of gas containing free oxygen through said slag layer onto said molten bath of pig iron so as to decarbonize said molten pig iron; blowing at least one second stream of gas containing free oxygen onto said slag layer without contacting said molten bath of pig iron so as to oxidize said slag layer, whereby the molten pig iron below said slag layer is dephosphorized, thus decarbonizing and dephosphorizing said pig iron; and simultaneously during said blowing of said first and said second streams of gas adding batches of basic additives to said molten bath.

17. In a method of refining a molten bath of phosphorous-containing pig iron also containing carbon and being covered by a slag layer, the steps of blowing at least one first stream of gas containing free oxygen through said slag layer onto said molten bath of pig iron so as to decarbonize said molten pig iron; blowing at least one second stream of gas containing free oxygen onto said slag layer without contacting said molten bath of pig iron so as to oxidize said slag layer, whereby the molten pig iron below said slag layer is dephosphorized, thus decarbonizing and dephosphorizing said pig iron; and simultaneously during said blowing of said first and said second streams of gas adding lime to said molten bath.

18. In a method of refining a molten bath of phosphorous-containing pig iron also containing carbon and being covered by a slag layer, the steps of blowing at least one first stream of gas containing free oxygen through said slag layer onto said molten bath of pig iron so as to decarbonize said molten pig iron; blowing at least one second stream of gas containing free oxygen onto said slag layer without contacting said molten bath of pig iron so as to oxidize said slag layer, whereby the molten pig iron below said slag layer is dephosphorized, thus decarbonizing and dephosphorizing said pig iron; and maintaining the level of said molten pig iron and said slag layer constant throughout said blowing of said first and said second streams of gas containing free oxygen.

19. In a method of refining a molten bath of phosphorous-containing pig iron also containing carbon and being covered by a slag layer, the steps of blowing at least one first stream of gas containing free oxygen through said slag layer onto said molten bath of pig iron so as to decarbonize said molten pig iron; blowing at least one second stream of gas containing free oxygen onto said slag layer without contacting said molten bath of pig iron so as to oxidize said slag layer, whereby the molten pig iron below said slag layer is dephosphorized, thus decarbonizing and dephosphorizing said pig iron; and continuously adding molten pig iron and slag-forming additives and continuously withdrawing dephosphorized and decarbonized iron and slag at a rate such that the level of said molten pig iron and said slag layer remain constant.

20. In a method of refining a molten bath of phosphorous-containing pig iron also containing carbon and being covered by a slag layer, the steps of blowing at least one first stream of air enriched with excess oxygen through said slag layer onto said molten bath of pig iron so as to decarbonize said molten pig iron; and blowing at least one second stream of air enriched with excess oxygen onto said slag layer without contacting said molten bath of pig iron so as to oxidize said slag layer, whereby the molten pig iron below said slag layer is dephosphorized, thus decarbonizing and dephosphorizing said pig iron.

References Cited in the file of this patent

UNITED STATES PATENTS

| | | |
|---|---|---|
| 49,052 | Bessemer | July 25, 1865 |
| 227,339 | Williams | May 4, 1880 |
| 586,047 | Last et al. | July 6, 1897 |
| 2,515,631 | Chiswik | July 18, 1950 |
| 2,668,759 | Tenenbaum | Feb. 9, 1954 |